US012693481B2

(12) United States Patent
Claessens et al.

(10) Patent No.: US 12,693,481 B2
(45) Date of Patent: Jul. 28, 2026

(54) MODULE INTERFACE FOR TELECOMMUNICATIONS CLOSURE

(71) Applicant: COMMSCOPE TECHNOLOGIES LLC, Hickory, NC (US)

(72) Inventors: Bart Mattie Claessens, Hasselt (BE); Stefan Sepelev, Wavre (BE)

(73) Assignee: COMMSCOPE TECHNOLOGIES LLC, Claremont, NC (US)

( * ) Notice: Subject to any disclaimer, the term of this patent is extended or adjusted under 35 U.S.C. 154(b) by 496 days.

(21) Appl. No.: 17/917,223

(22) PCT Filed: Apr. 6, 2021

(86) PCT No.: PCT/US2021/025998
§ 371 (c)(1),
(2) Date: Oct. 5, 2022

(87) PCT Pub. No.: WO2021/207228
PCT Pub. Date: Oct. 14, 2021

(65) Prior Publication Data
US 2023/0152545 A1      May 18, 2023

Related U.S. Application Data

(60) Provisional application No. 63/005,907, filed on Apr. 6, 2020.

(51) Int. Cl.
*G02B 6/38* (2006.01)
*G02B 6/44* (2006.01)

(52) U.S. Cl.
CPC ......... *G02B 6/3897* (2013.01); *G02B 6/3825* (2013.01); *G02B 6/4442* (2013.01); *G02B 6/4446* (2013.01); *G02B 6/4454* (2013.01)

(58) Field of Classification Search
CPC .. G02B 6/4442; G02B 6/3825; G02B 6/3897; G02B 6/4446; G02B 6/4454
See application file for complete search history.

(56) References Cited

U.S. PATENT DOCUMENTS 7,369,740 B2      5/2008   Tinucci
8,657,504 B2      2/2014   Wang et al.
(Continued)

FOREIGN PATENT DOCUMENTS

WO      2008/118927 A1      10/2008
WO      2020/030946 A1      2/2020

OTHER PUBLICATIONS

International Search Report and Written Opinion of the International Searching Authority for International Patent Application No. PCT/US2021/025998 mailed Jul. 26, 2021, 8 pages.
(Continued)

*Primary Examiner* — Thomas A Hollweg
*Assistant Examiner* — Kirsten D. Endresen
(74) *Attorney, Agent, or Firm* — Merchant & Gould P.C.

(57) ABSTRACT

A telecommunications closure including a closure body defining an interior. An organizer is located within the interior of the closure body. The organizer including a base, a cable seal, a cable management device, and a mounting interface; wherein the mounting interface includes a mating interface including a plurality of mating shapes which interface with one another. The mating shapes include at least one lower protrusion and a recess, wherein the recess is larger than the lower protrusion, and at least one mounting tab. The mating shapes can include V-shapes.

1 Claim, 21 Drawing Sheets

(56) References Cited

U.S. PATENT DOCUMENTS

| 8,965,168 | B2 * | 2/2015 | Cowen ................. G02B 6/4455 |
| | | | 385/135 |
| 11,867,872 | B2 | 1/2024 | Coenegracht et al. |
| 12,019,298 | B2 | 6/2024 | Geens et al. |
| 2017/0235072 | A1 | 8/2017 | Schuster et al. |
| 2018/0329162 | A1 | 11/2018 | Claessens et al. |
| 2019/0018211 | A1 | 1/2019 | Aerts et al. |
| 2019/0018212 | A1 * | 1/2019 | Allen ................... G02B 6/4454 |
| 2019/0064447 | A1 * | 2/2019 | Chang .................. G02B 6/4292 |
| 2023/0090507 | A1 | 3/2023 | Claessens et al. |
| 2023/0393346 | A1 | 12/2023 | Claessens et al. |

OTHER PUBLICATIONS

Extended European Search Report for Application No. 21784791.2 mailed Jun. 17, 2024.

* cited by examiner

330b

36

330b

MODULE INTERFACE FOR TELECOMMUNICATIONS CLOSURE

CROSS-REFERENCE TO RELATED APPLICATION

This application is a National Stage Application of PCT/US2021/025998, filed on Apr. 6, 2021, which claims the benefit of U.S. Patent Application Ser. No. 63/005,907, filed on Apr. 6, 2020, the disclosures of which are incorporated herein by reference in their entireties. To the extent appropriate, a claim of priority is made to each of the above disclosed applications.

BACKGROUND

Telecommunications enclosures include various structures for receiving cables, managing cables, and connecting cables to other cables through splices, splitters, or connectors and adapters. Many times the cables are fiber optic cables.

Improvements are desired for mounting various structures within a telecommunications closure. Some concerns in this area include ease of installation, ease of use, strength, and/or reliability.

SUMMARY

A mounting interface is provided for mounting a module, such as a cable management device, to a further structure, such as an organizer. The organizer can be part of a telecommunications closure or other telecommunications device or equipment.

In one embodiment, the cables to be managed are fiber optic cables.

A mounting interface is provided between the cable management device and a mating device, such as the organizer, and includes one or a plurality of mating shapes which interlock with one another to form a mating interface.

In one embodiment, the mating interface includes interlocking shapes or structures which provide engageable surfaces or shoulders which engage one another in at least one direction parallel to an axial direction of a cable or cables attached to the cable management device.

In one embodiment, the interlocking shapes include one or a plurality of V-shapes and a reciprocal surface for receiving the one or the plurality of the V-shapes. The interlocking shapes can include mating protrusions and recesses.

In one embodiment, two oppositely facing V-shapes are provided for mating along an axial or parallel direction of the cable in two opposite directions along the cable axis.

In one embodiment, the mounting interface may also include one or a plurality of flexible tabs which interlock with one or a plurality of mating shoulders.

In one embodiment, the mounting interface may also include, or alternatively include, one or a plurality of clips which interlock with one or a plurality of mating slots.

In one embodiment, the cable management device includes a base which holds a fiber optic adapter. The fiber optic adapter receives two cables and connectors terminating the cables in axial alignment.

In one embodiment, one connector terminates a cable internal to the closure, and a second connector mated to the first connector terminates a cable entering the closure.

In one embodiment, axial load applied to the second cable and the second connector is applied to the mounting interface, including the interlocking shapes, such as the protruding V-shapes, and the recessed V-shapes.

In one embodiment, the cable management device is removably mounted to the organizer, or other device.

DETAILED DESCRIPTION

Figure 1:
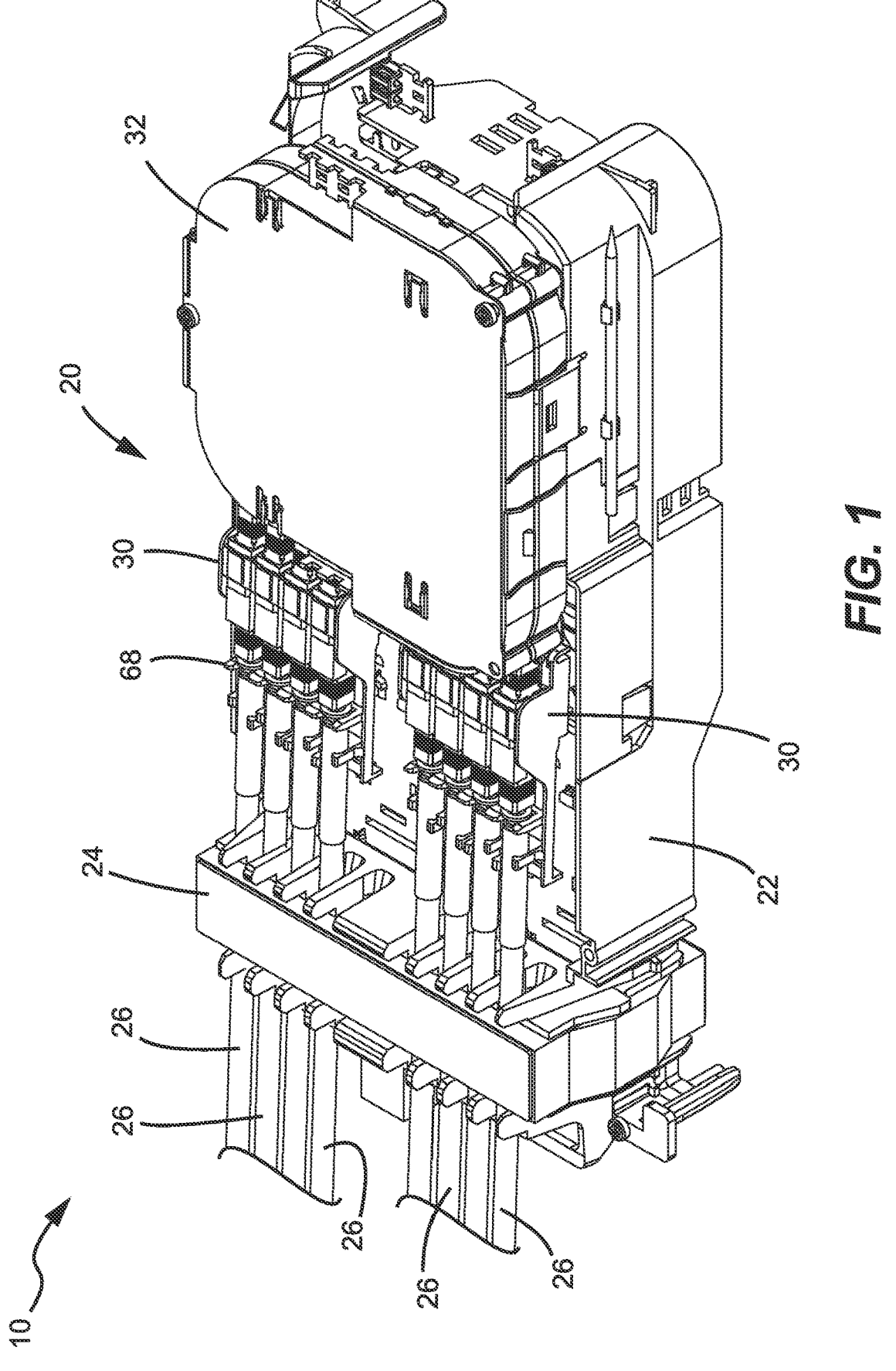
FIG. 1 shows an embodiment of an organizer for use inside a closure for receiving a plurality of cables.
Figure 1A:
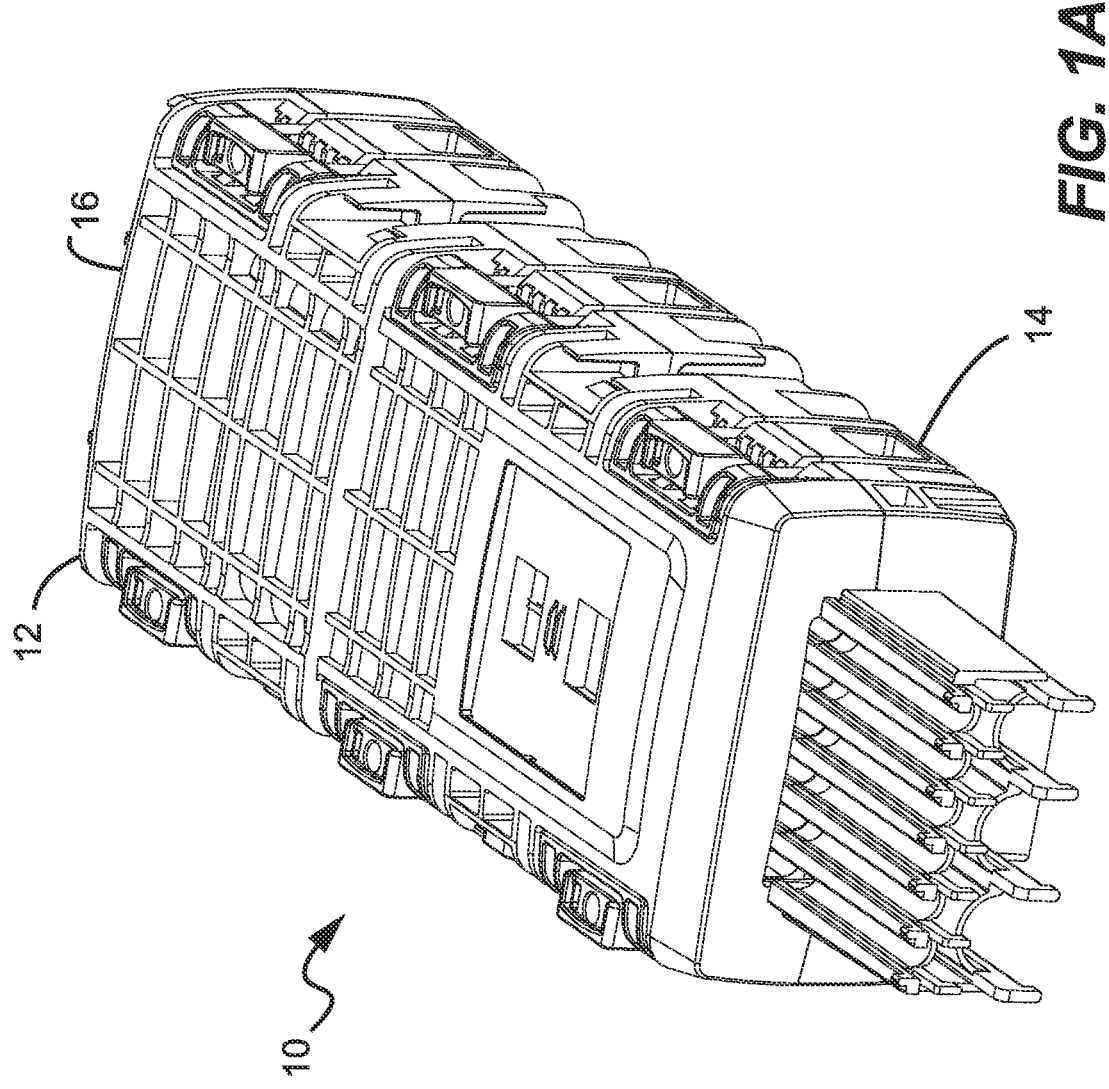
FIG. 1A shows the organizer of FIG. 1 inside a closure.
Figure 1B:
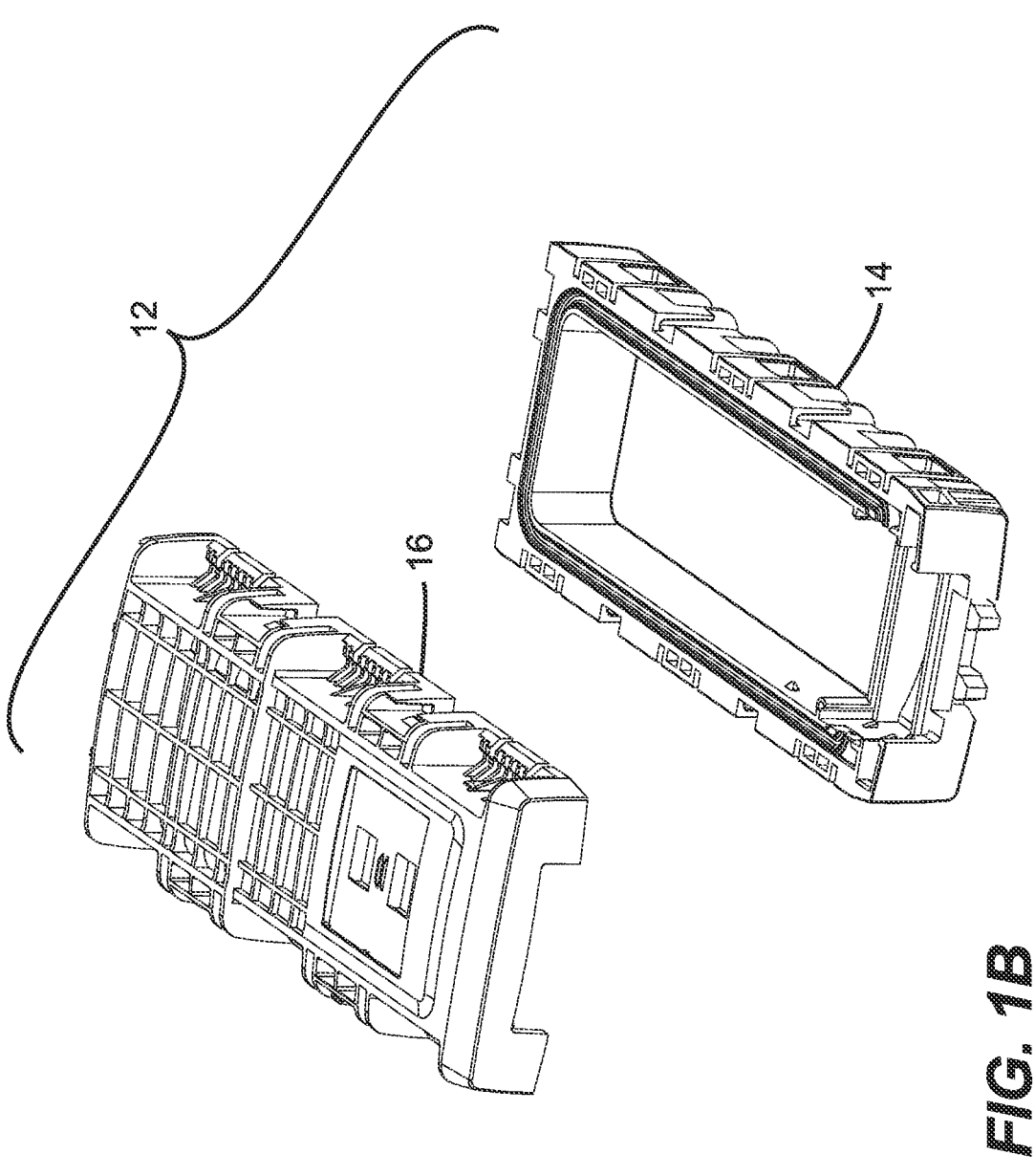
FIG. 1B shows the closure of FIG. 1A without the organizer, and showing the closure base and the closure top.
Figure 2:
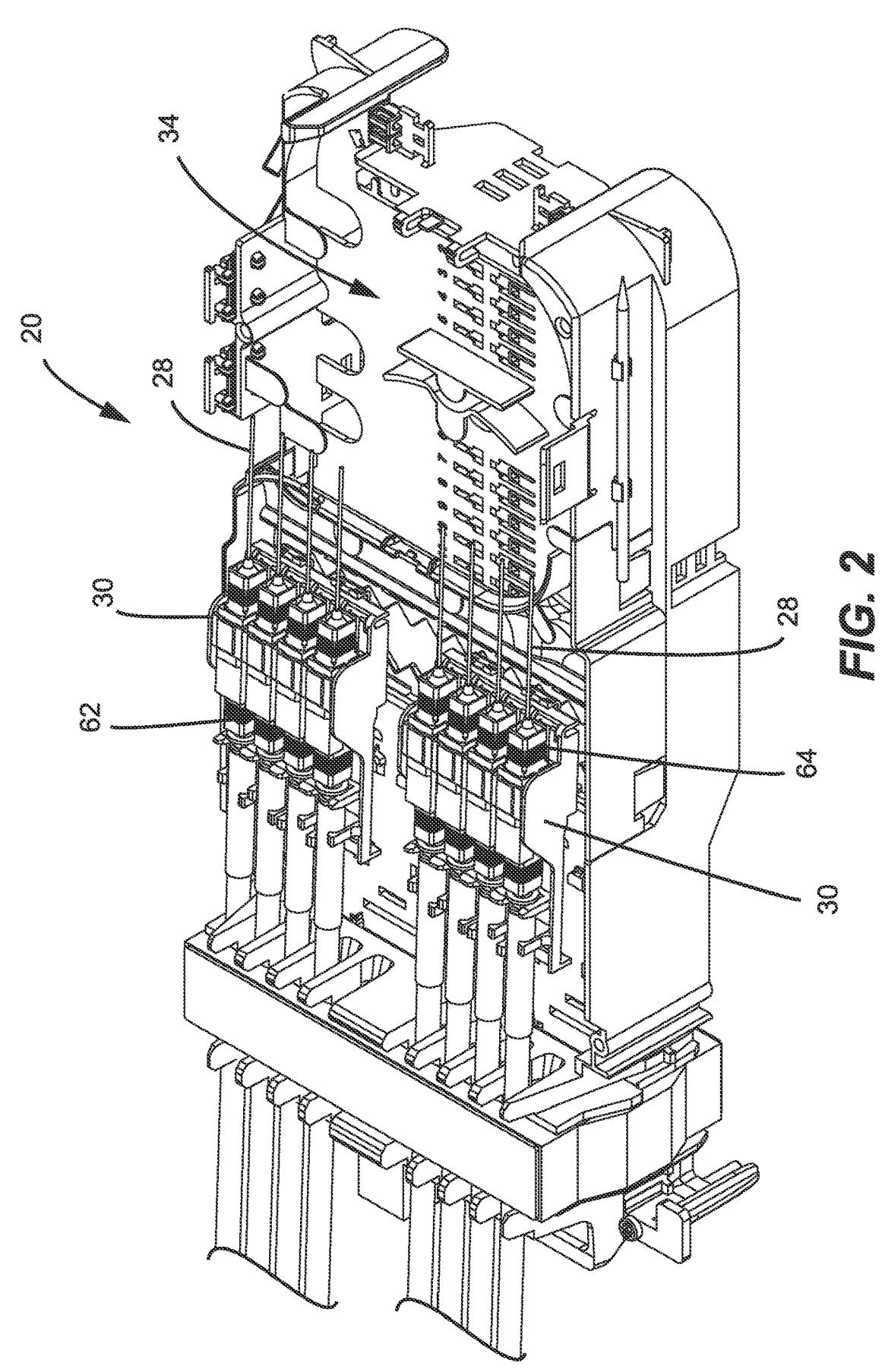
FIG. 2 shows an additional view of the organizer of FIG. 1 with portions removed and showing the various cables being managed by the organizer.
Figure 3:
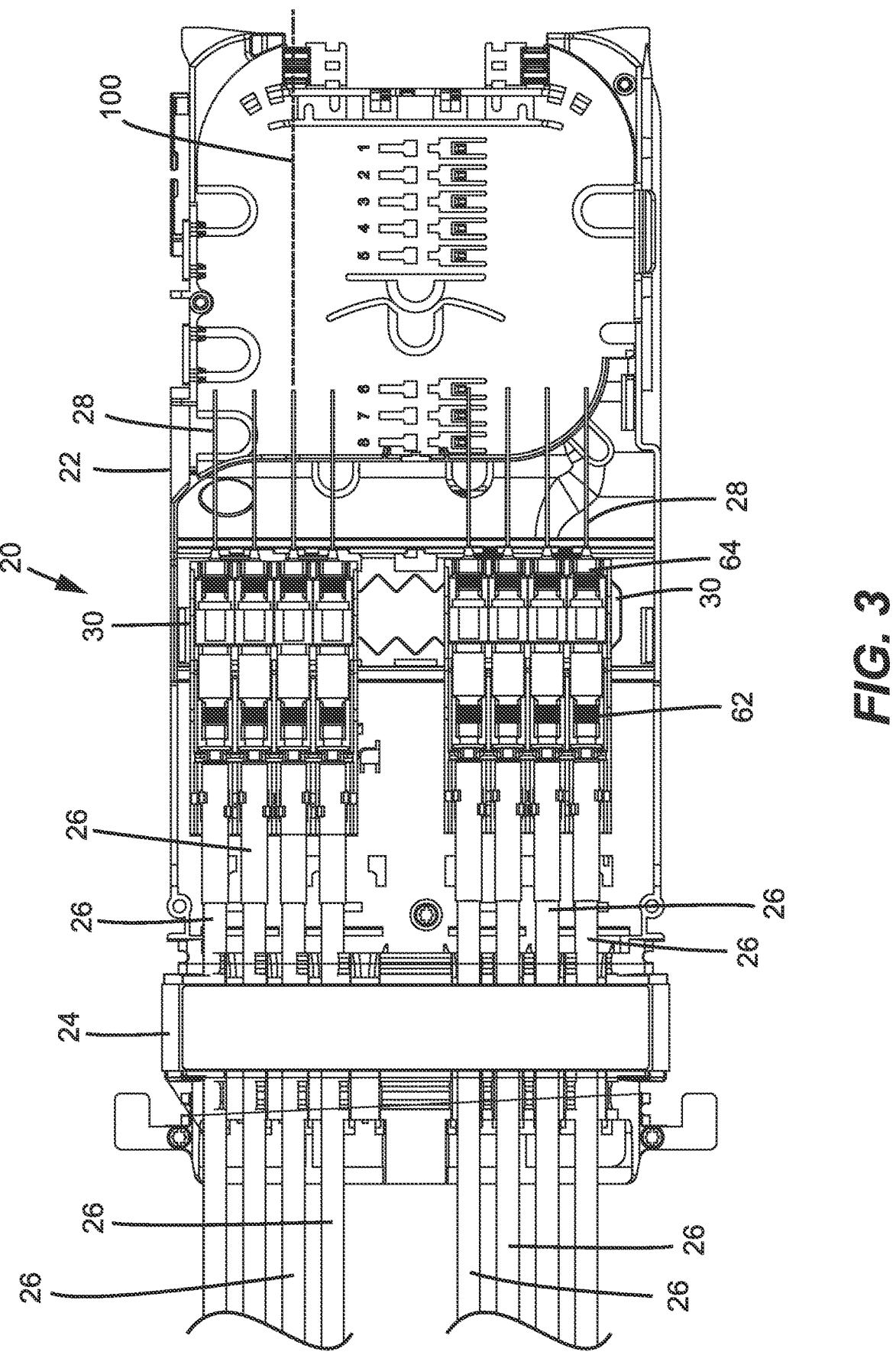
FIG. 3 is a top view of the organizer of FIG. 2.
Figure 4:
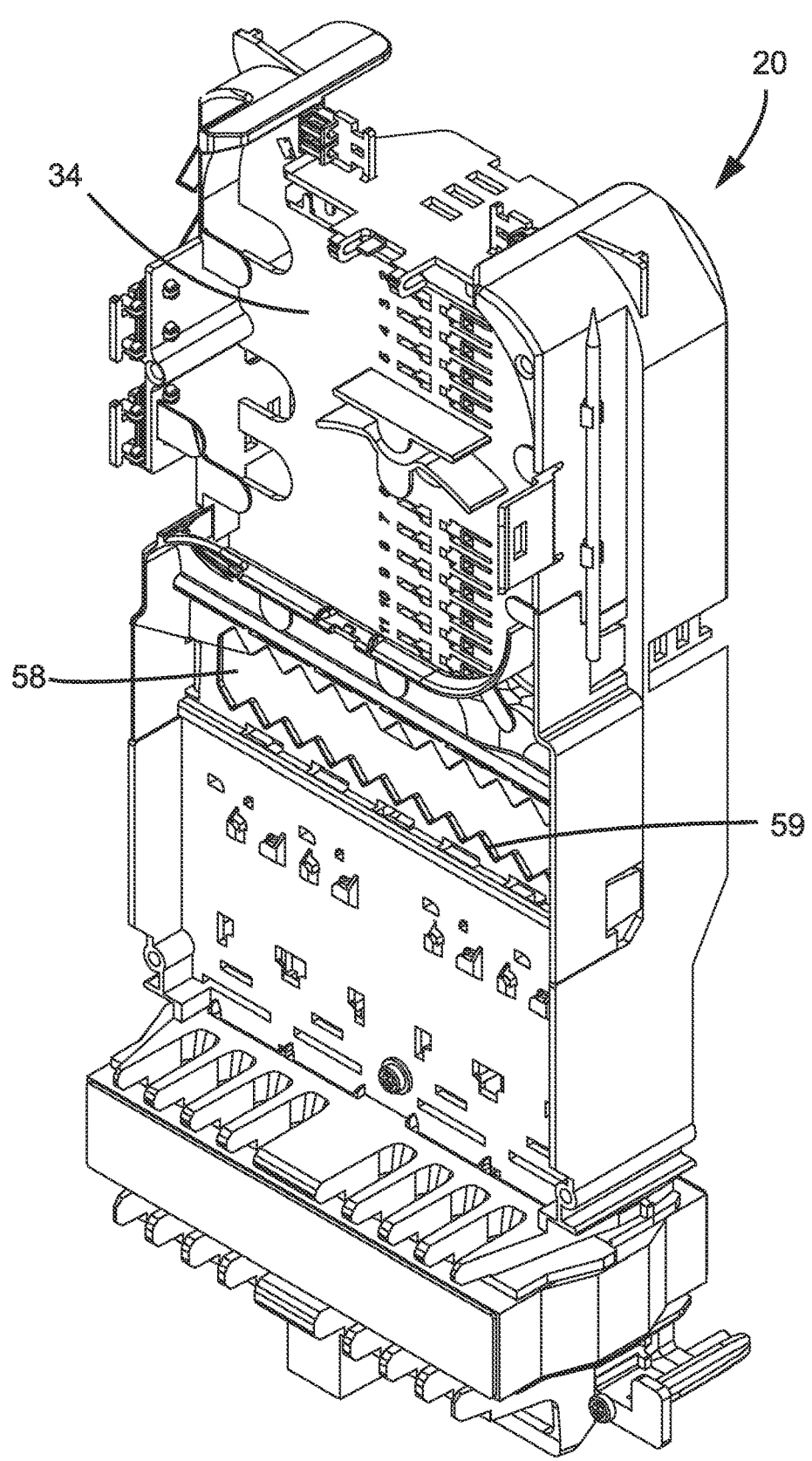
FIG. 4. is a perspective view of the organizer shown without any cables, or two of the cable management devices.
Figure 5:
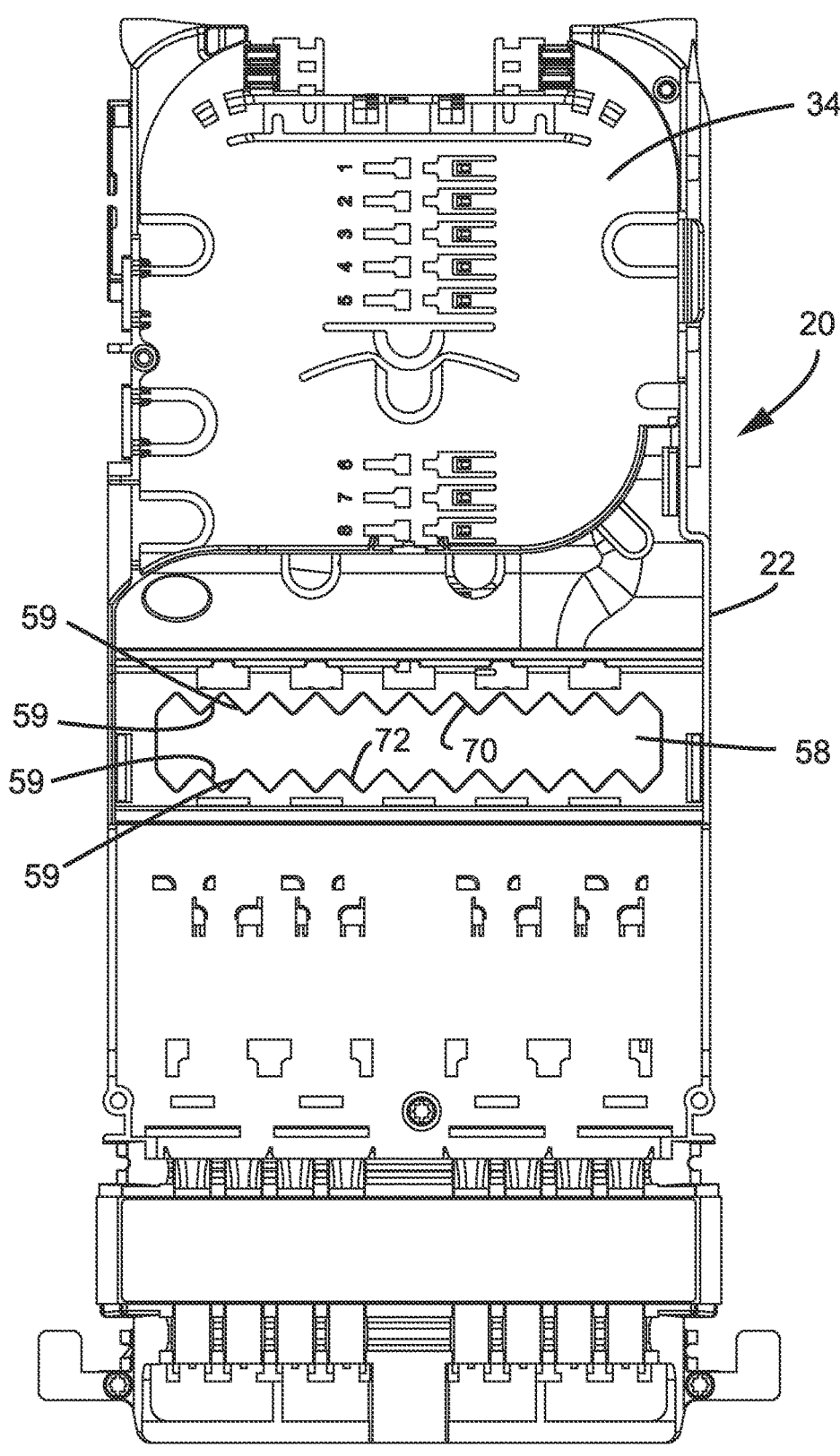
FIG. 5 is a top view of the organizer of FIG. 4.

Referring now to FIGS. 1-5, 27 and 28, a closure 10 is shown including a closure body 12 and an interior organizer 20. Closure body 12 is generally a sealed structure for sealing against dust and moisture from entering an interior of closure body 12. Cables 26 enter and exit closure body 12. Within closure body 12, the cables 26 are spliced, managed, split, or connected to other cables with other connectors through adapters, or otherwise managed within the interior of closure 10. Closure body 12 in the illustrated example includes a base 14 and a top 16.

Organizer 20 includes a base 22, a cable seal 24, and cable management devices 30. In one example cable management device 30 manages cables 26 that are connected to other cables 28 through adapters 60 which connect cable connectors 62 of cables 26 through other cables with connectors 64.

Other devices like trays 32 can be provided to further manage the cables, or old splices or splitters. Area 34 on base 22 can also hold other cable management devices. Also, the opposite side of organizer 20 can also include cables and cable management devices.

Figure 6:
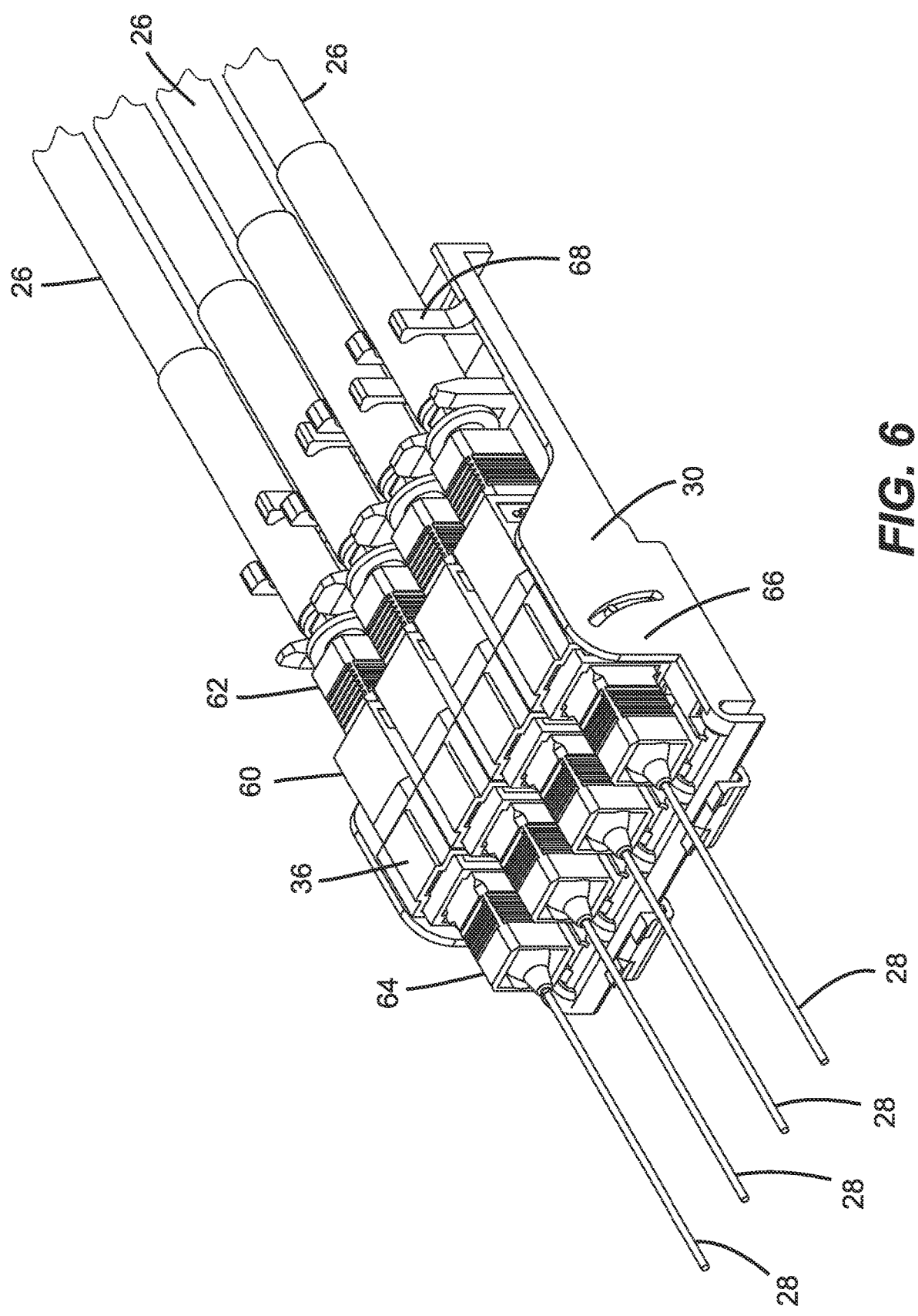
FIG. 6 is a perspective view of a first cable management device mountable to the organizer of FIGS. 4 and 5, including cables, connectors and adapters, where the adapters pivot for access.
Figure 7:
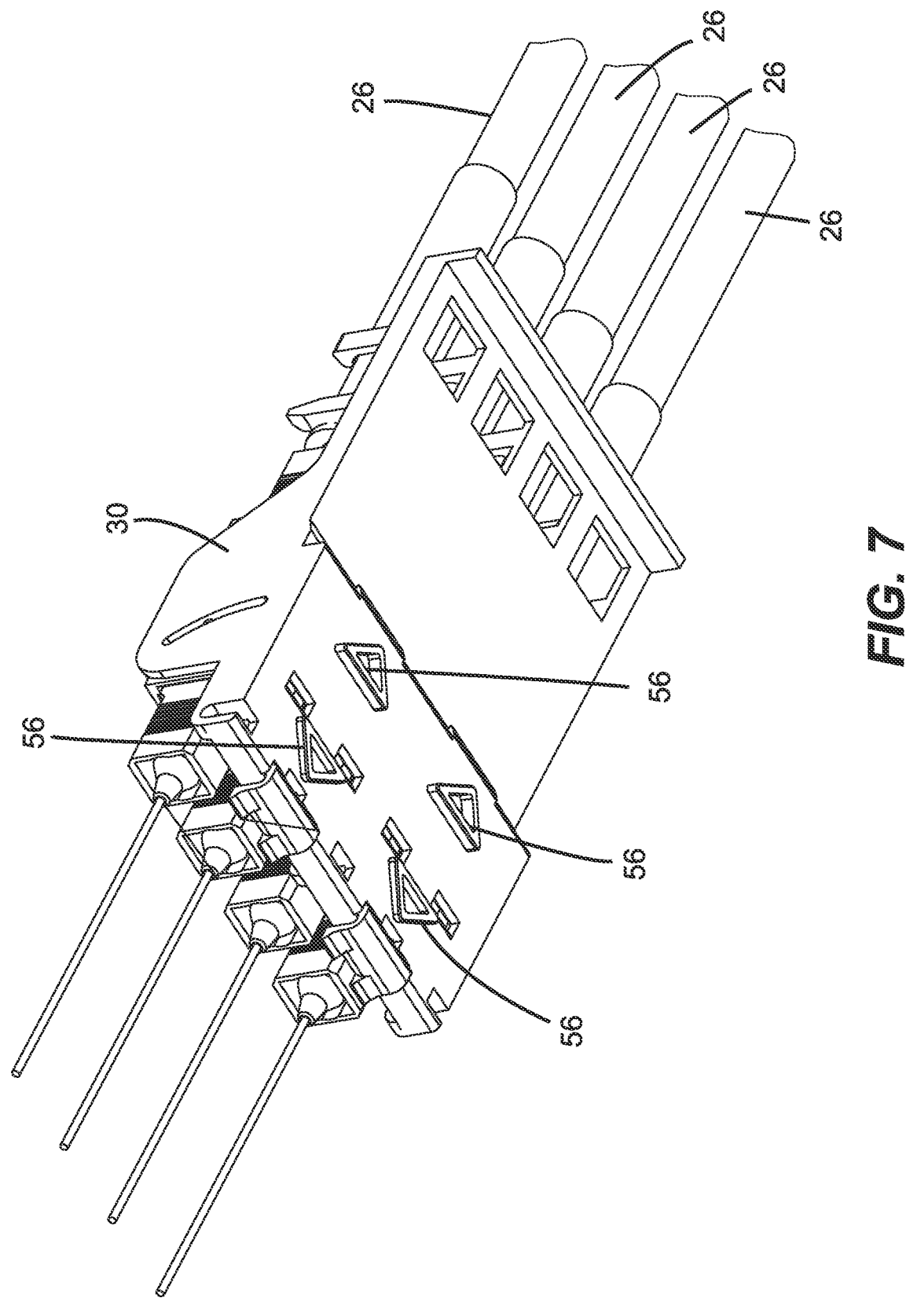
FIG. 7 is a further perspective view of the cable management device of FIG. 6.
Figure 8:
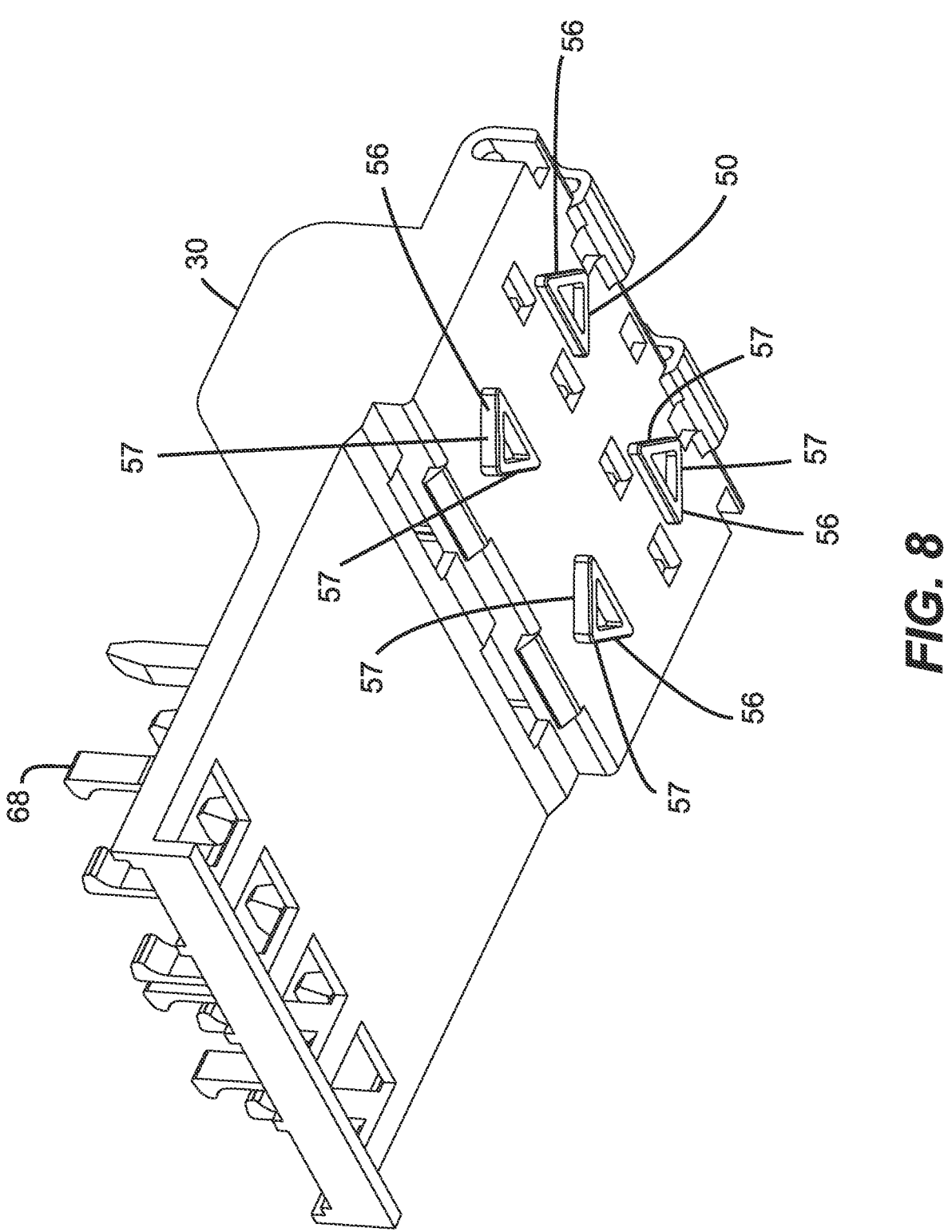
FIG. 8 is a further perspective view of the cable management device of FIG. 7, without the cables, connectors and adapters.
Figure 9:
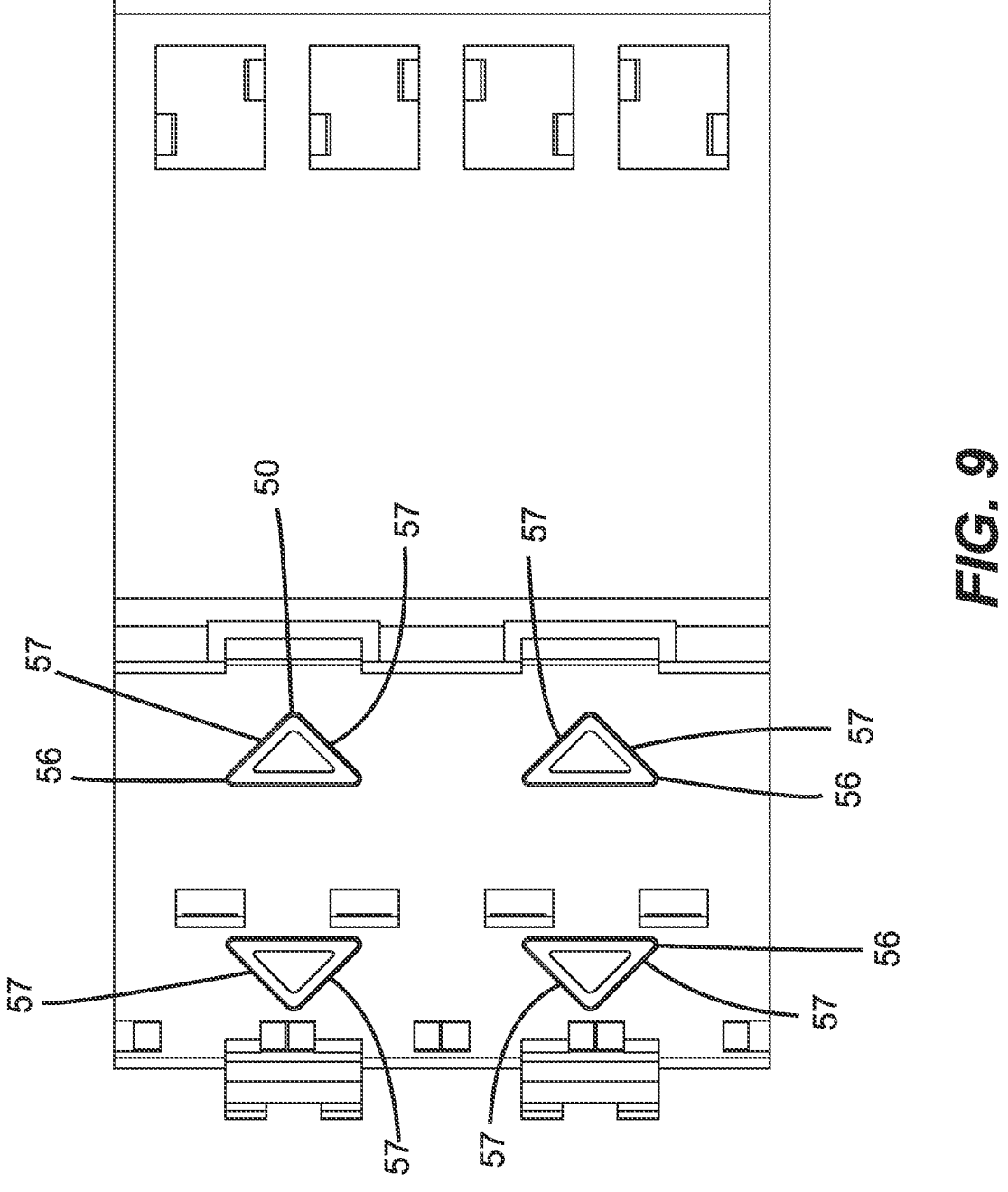
FIG. 9 is a bottom perspective view of the cable management device of FIG. 8.
Figure 10:
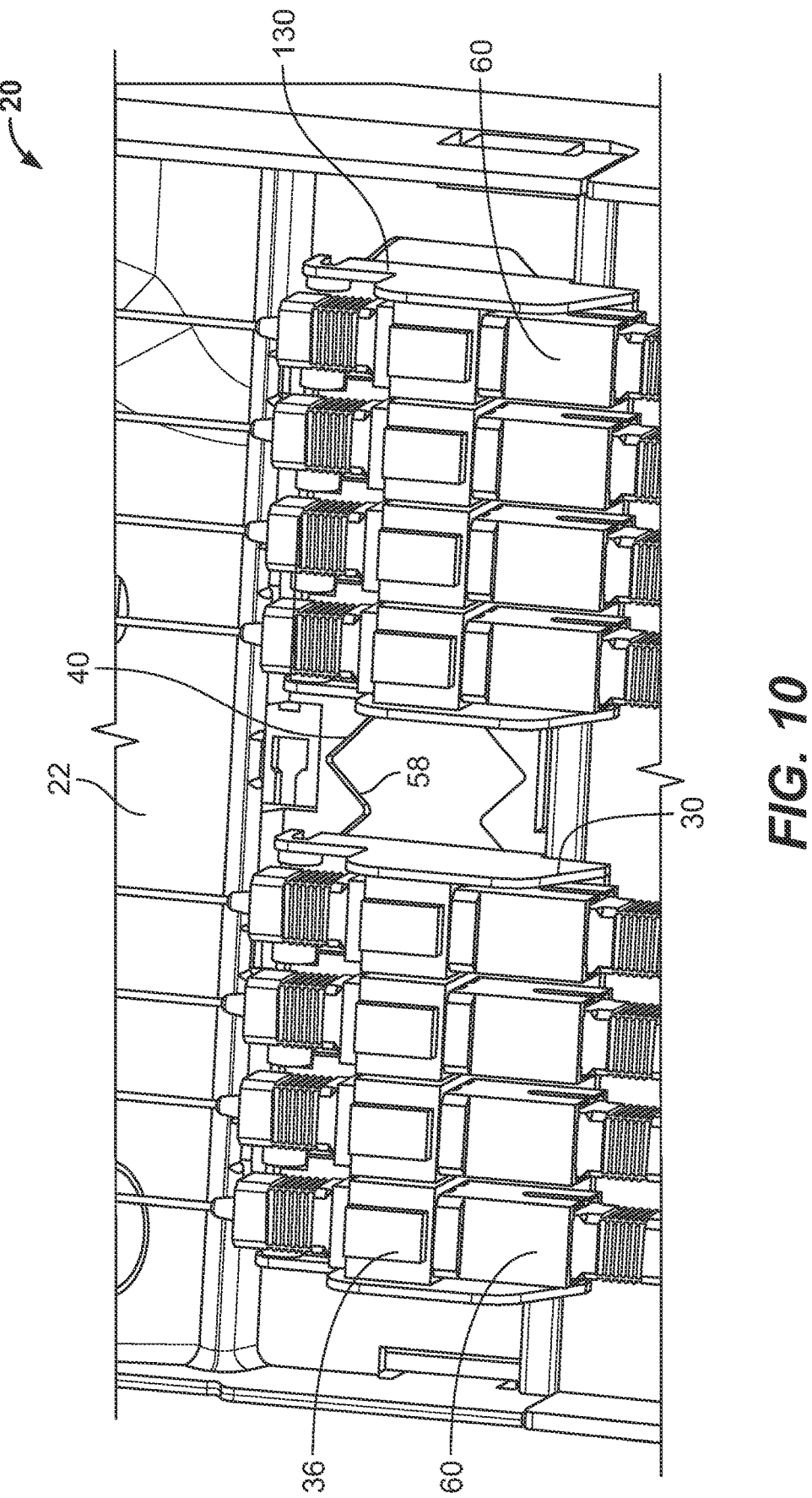
FIG. 10 shows a portion of the organizer and a further embodiment of a cable management device, including cables, connectors and adapters; where the adapters pivot for access.
Figures 11, 12:
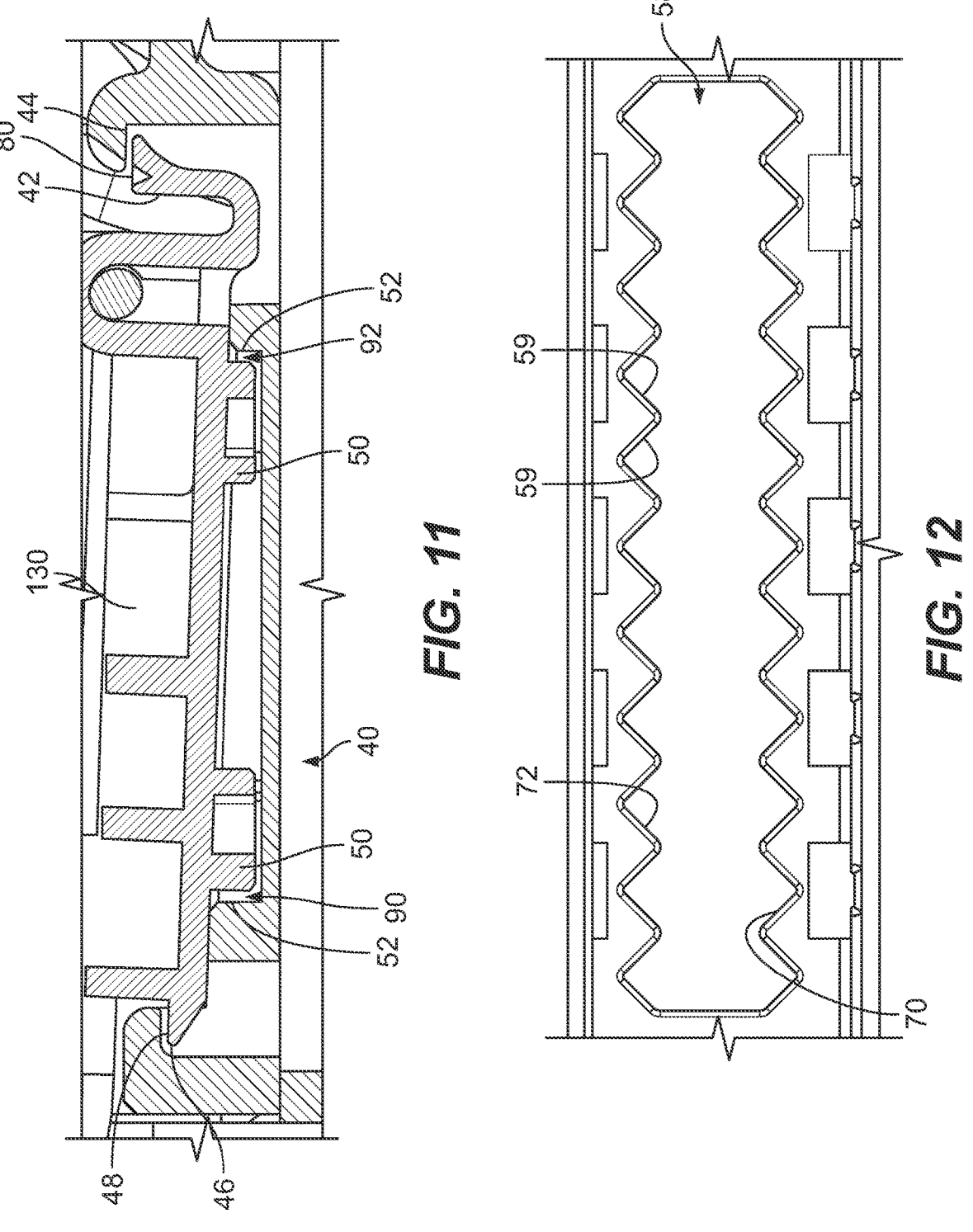
FIG. 11 shows a cross-sectional view of the cable management device of FIG. 10 mounted to the organizer of FIG. 10.
FIG. 12 is a top view of a portion of the organizer showing the mounting area for the cable management device.
Figures 13, 14:
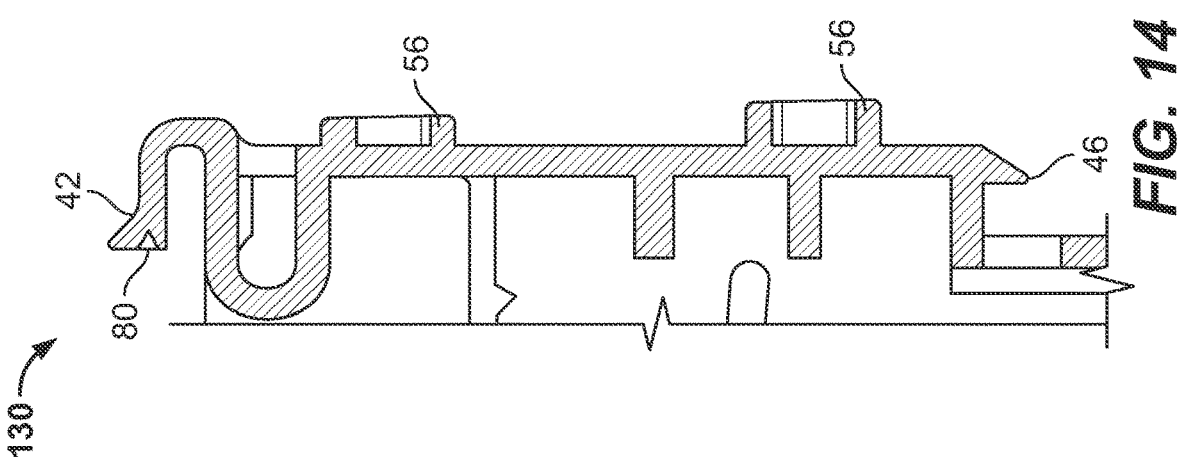
FIG. 13 is a bottom view of the cable management device shown in FIG. 10.
FIG. 14 is a cross-sectional side view of the cable management device of FIG. 10.

As shown in FIG. 6, cable management device 30 includes a structure for holding adapters 60 and mating connectors 62, 64. In one example the adapters are SC type and clip into device 30. Device 30 also includes a cable clip 68.

Cable management device 30 includes a mounting interface 40 for mounting to base 22 of organizer 20. In one embodiment, mounting interface 40 includes interlocking shapes 50 on cable management device 30 which mate with interlocking shapes 52 on organizer 20. In the example shown, interlocking shapes 50 in the form of axially spaced triangular shapes 56 are provided on cable management device 30 which face in opposite directions. In one embodiment, at least two opposing triangular shapes 56 are provided. In some embodiments, two or more pairs of triangular shapes 56 are provided. Triangular shapes 56 mate with recesses 58 of base 22 of organizer 20. In some embodiments, only one shape (or a row of shapes) is provided, such as to take an axial pull applied to cables 26. The opposing shapes in the illustrated embodiments take either pull or push loads on cables 26.

In one embodiment, the V-shapes of the triangles are protrusions with fit into recesses 58 of base 22. Surfaces 57 (two of them) define the mating surfaces for mating with the V-shaped surfaces 59 (two of them) of recesses 58. As shown, recesses 58 are one continuous recess from a top edge 70 to a bottom edge 72. Alternatively, the recesses can be separate for each protruding V-shape or pair of V-shapes.

In one embodiment, the mating shapes include at least one lower protrusion and a recess, wherein the recess is larger than the lower protrusion. In one embodiment, there are two spaced apart lower protrusions. The lower protrusions define V-shapes, and are spaced apart by at least an axial length of the V-shape in the cable axis direction.

The V-shapes also can perform a centering function for device 30 mounting to base 22, so as to maintain the axial positions they are located in.

Other shapes besides V-shapes 57, 59 are possible, such as U-shapes. Round shapes can also work. One aspect that improves functioning of the shapes for mounting is that the recess is larger than the lower protrusion, such as in the axial direction of the cable.

Mounting interface 40 further includes in one embodiment one or more of flexible mounting tabs 42 which engage shoulders 44. In addition, or in an alternative, mounting interface 40 includes clips 46 which engage slots 48. Mounting tabs 42 and clips are on opposite sides of base portion 36 of cable management device 30.

Notch 80 on tab 42 can be used to retract tab 442 to allow removal of device 30 from base 22.

As shown in FIGS. 6-9, cable management device 30 can include upper structures 66 which allow for pivoting movement of adapters 60 as desired.

Referring now to FIGS. 10-14, an alternative embodiment of a cable management device 130 is shown where the adapters also pivot, but no cable clip is provided. However, a similar mounting interface 40 is utilized.

Figure 16:
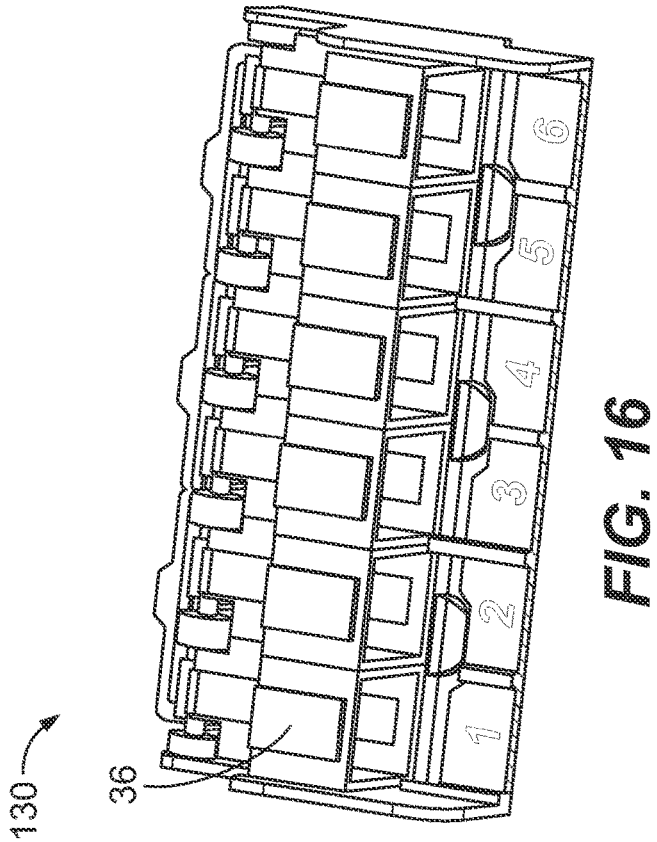
FIG. 16 shows a second example of a cable management device, like the device of FIG. 10.
Figure 15:
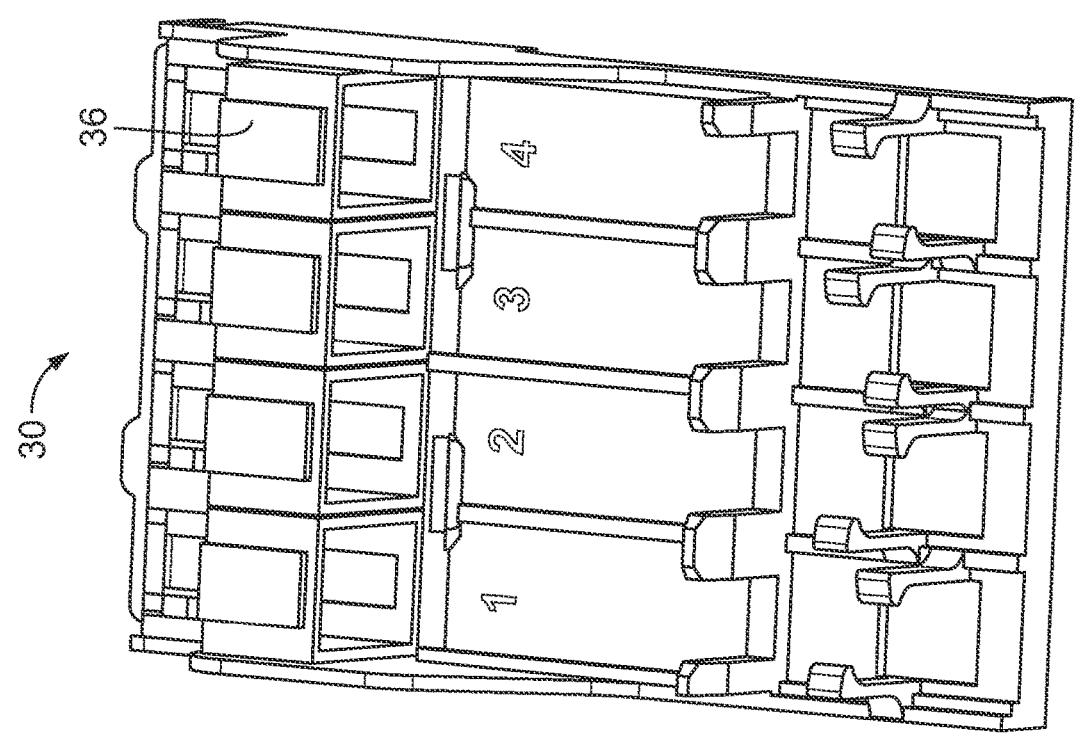
FIG. 15 shows an example cable management device, like the device of FIG. 6.

Referring now to FIG. 15, a further illustration of device 30 is provided for showing how the pivoting adapters 60 are mounted for improved access for connecting and disconnecting connectors to adapter 60. FIG. 16 shows structure for pivoting adapters in a smaller profile cable management device 130.

Figure 17:
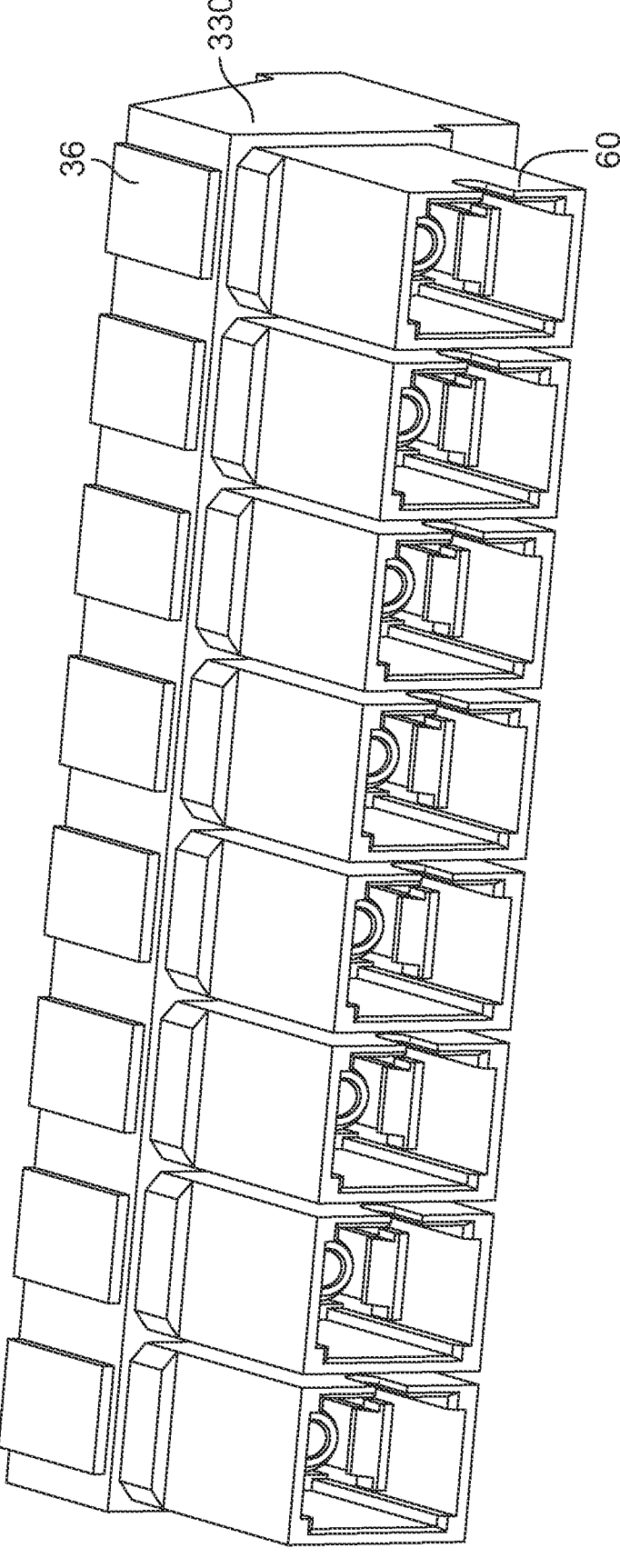
FIG. 17 shows another embodiment of a cable management device; where the adapters do not pivot.

FIG. 17 shows a cable management device 330 wherein the adapters 60 do not pivot and are permanently mounted in an axial direction.

Figures 18, 19, 20:
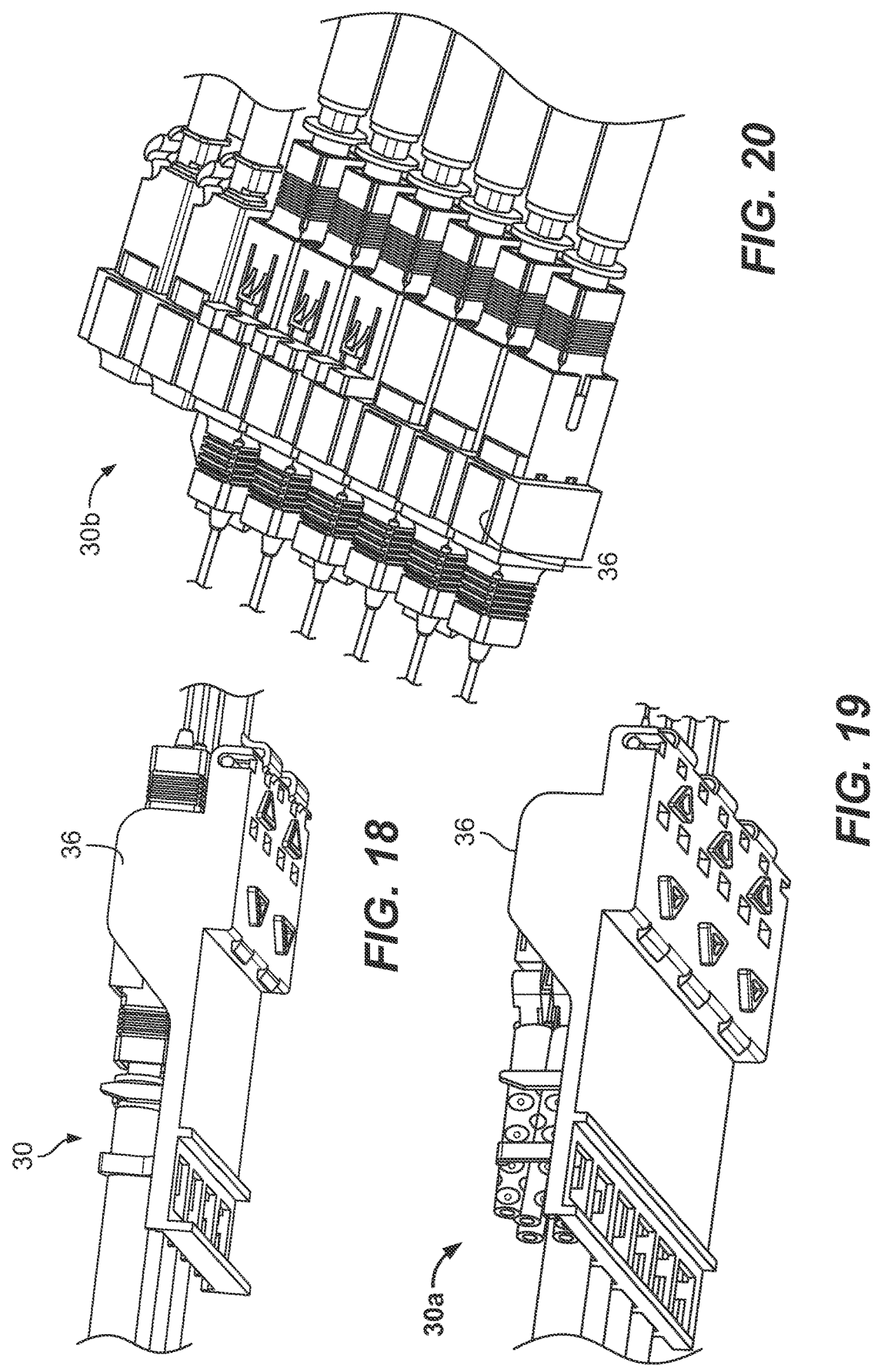
FIG. 18 shows a cable management device holding four adapters.
FIG. 19 shows a cable management device holding four SC adapters and two duplex LC adapters.
FIG. 20 shows a cable management device holding six SC adapters and two duplex LC adapters.

FIGS. 18 through 20 show different embodiments of cable management devices 30, 30a, 30b having different widths, and different numbers of adapters. A mounting interface 40 is provided along a lower surface of the cable management devices of FIGS. 18 and 19.

FIG. 18 shows a cable management device 30 holding four adapters.

FIG. 19 shows a cable management device 30a holding four SC adapters and two duplex LC adapters.

FIG. 20 shows a cable management 30b device holding six SC adapters and two duplex LC adapters.

Figure 21:
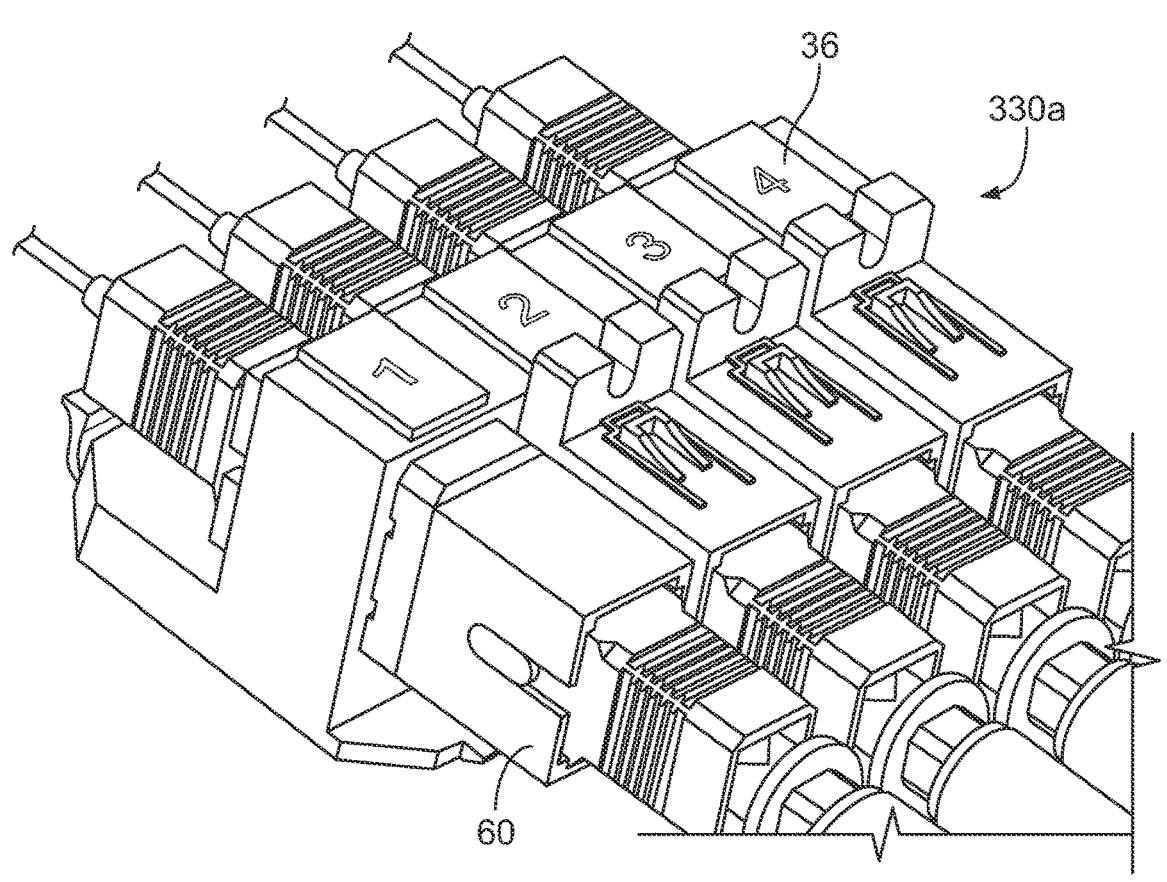
FIG. 21 shows a cable management device holding four fixed SC adapters.
Figure 22:
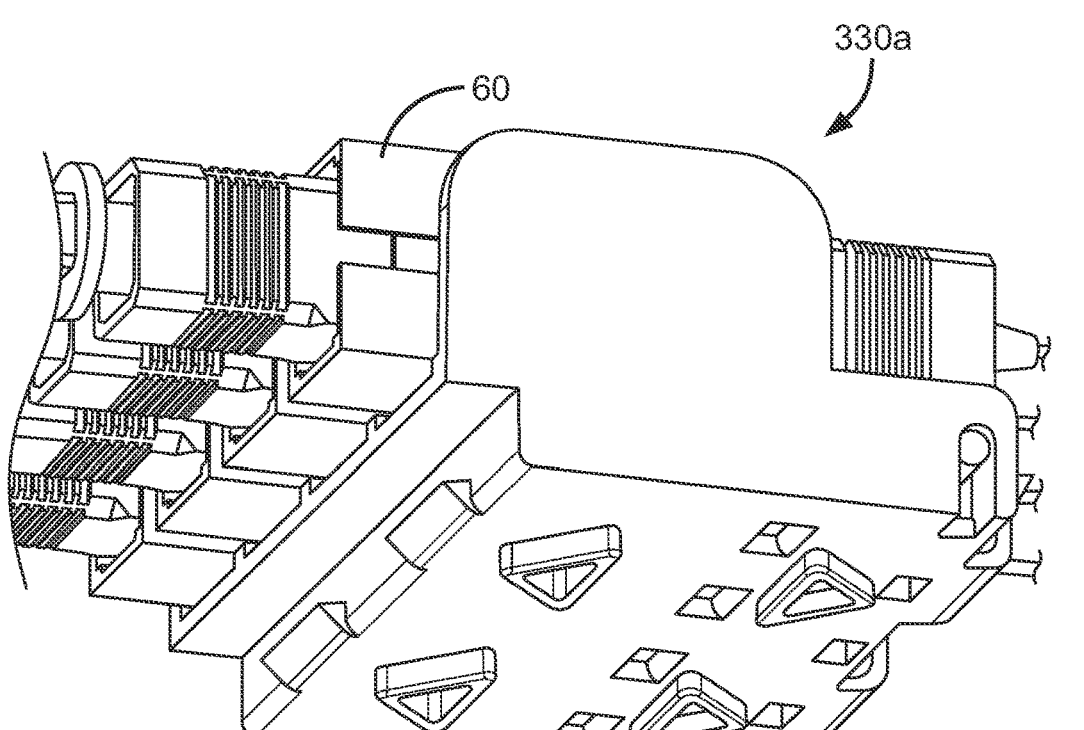
FIG. 22 shows a bottom view of the cable management device of FIG. 21.

FIGS. 21 and 22 show a cable management device 330a holding four fixed SC adapters.

Figure 23:
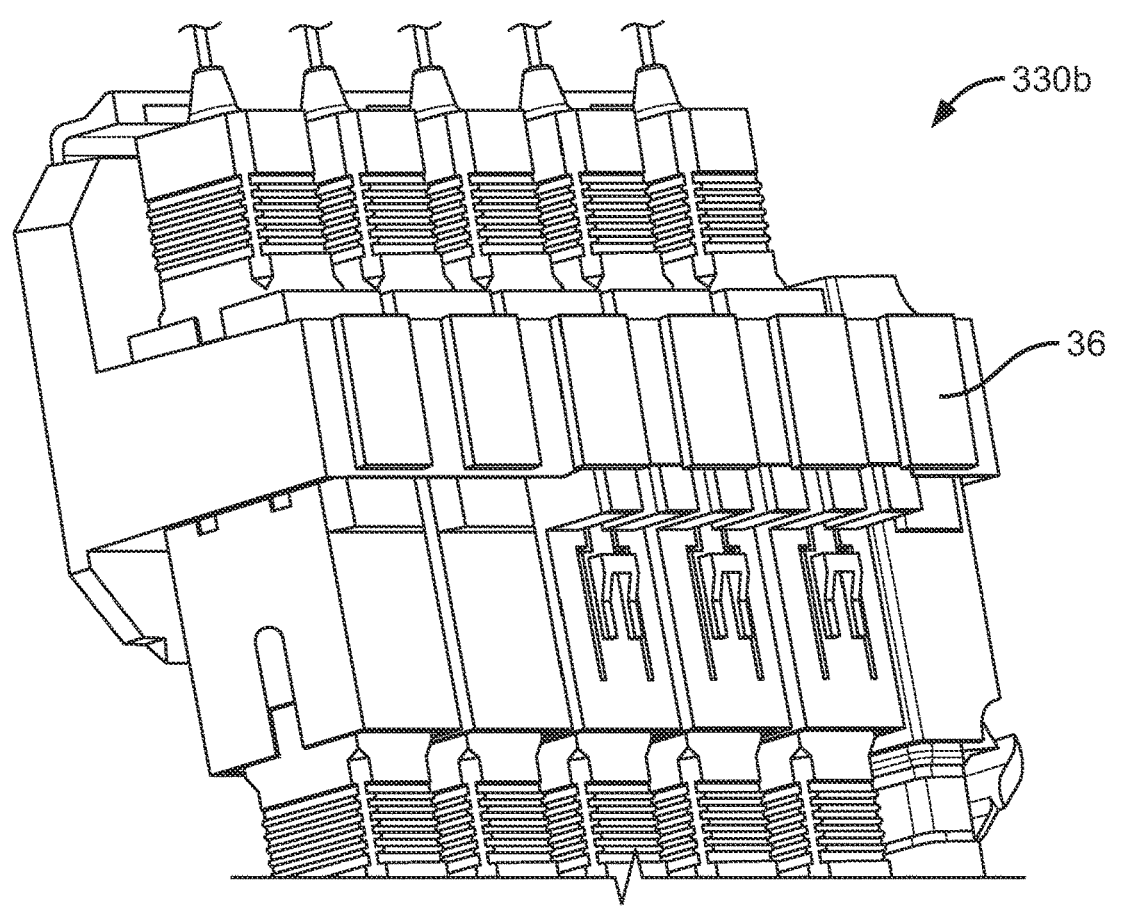
FIG. 23 shows a cable management device holding four fixed SC adapters and two fixed LC adapters.
Figure 24:
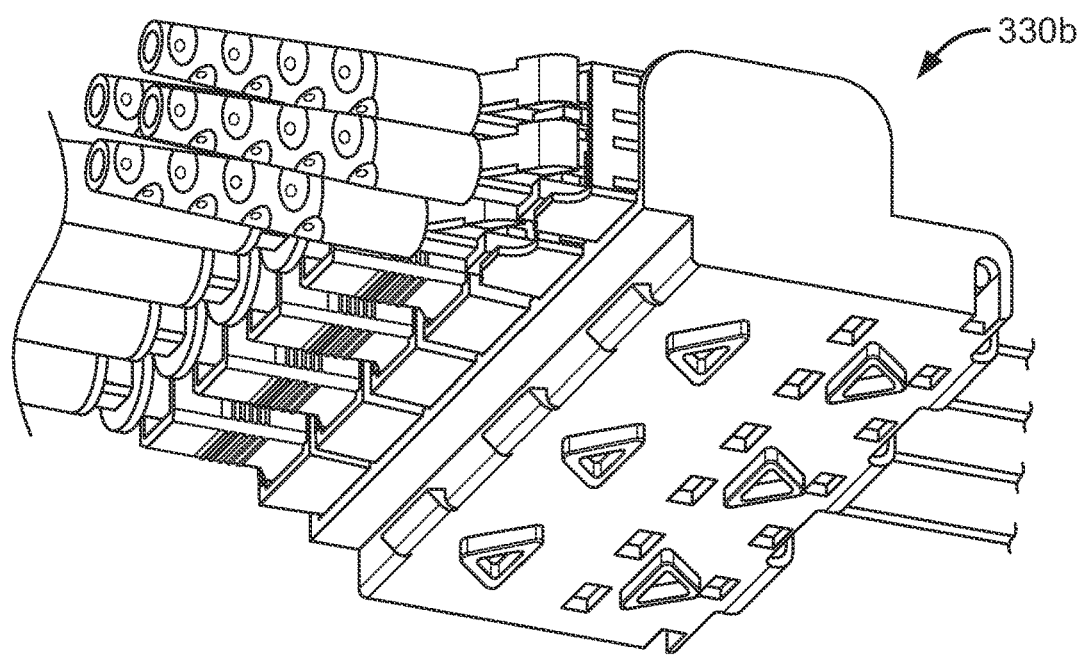
FIG. 24 shows a bottom view of the cable management device of FIG. 23.

FIGS. 23 and 24 show a cable management device 330b holding four fixed SC adapters and two fixed LC adapters.

Figure 25:
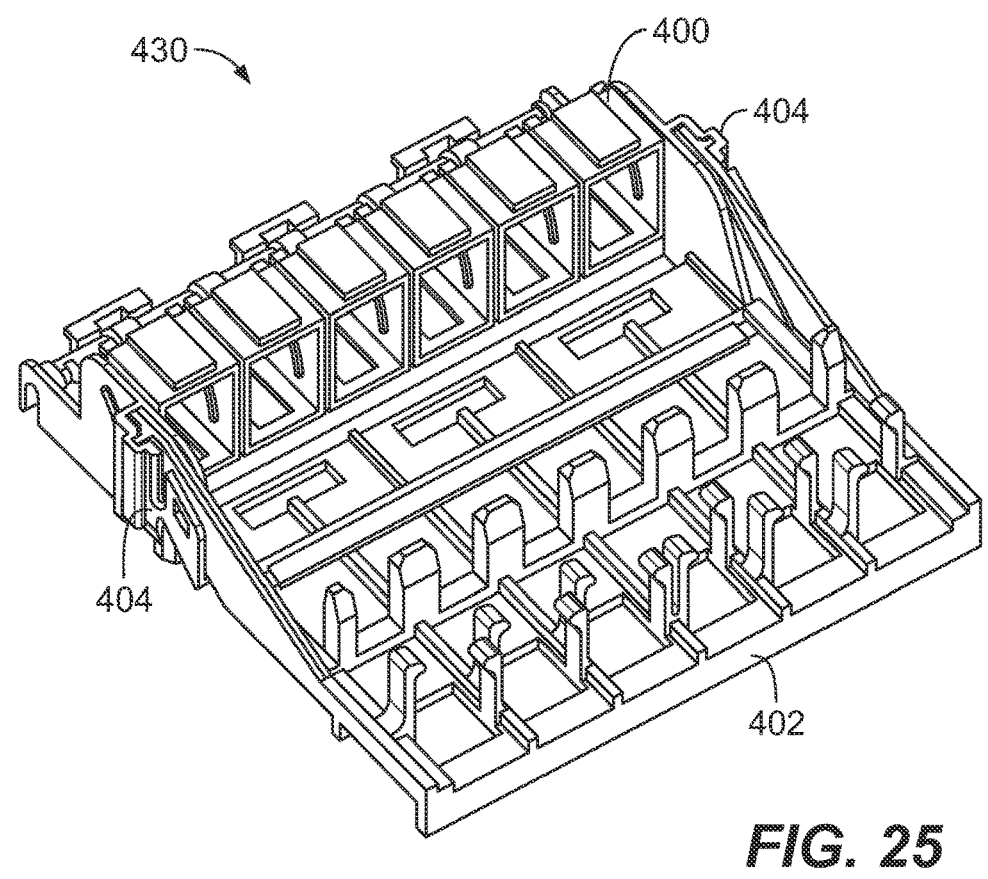
FIG. 25 shows another embodiment of a cable management device, where the adapter holder is a separate part from the cable holder part, and mountable to the cable holder part.
Figure 26:
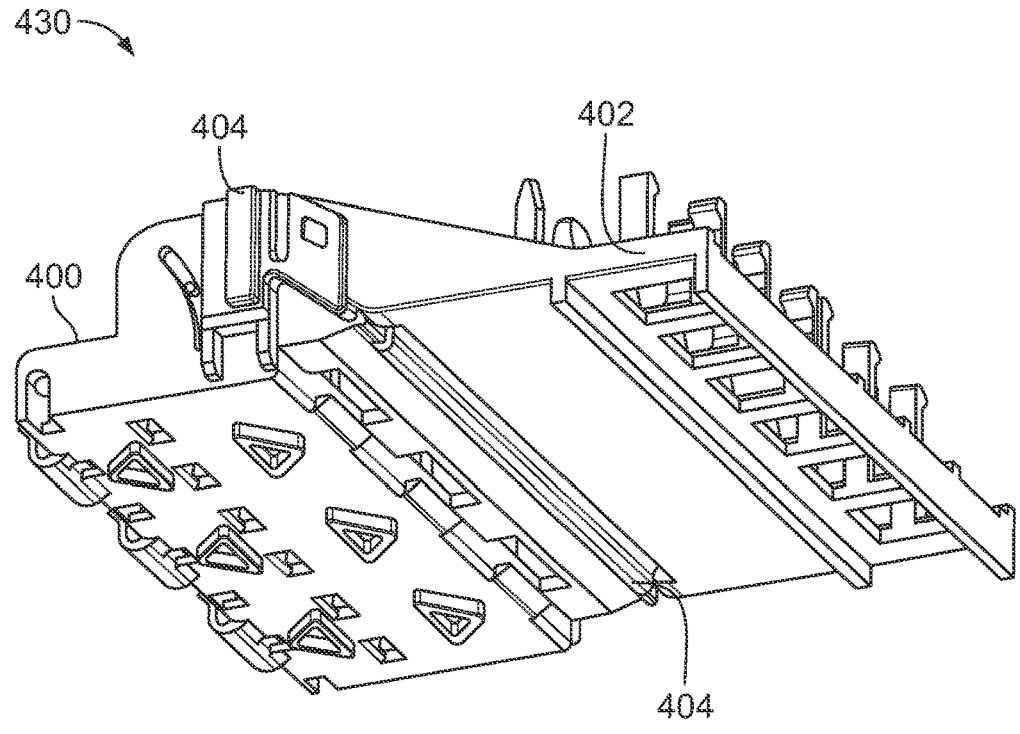
FIG. 26 shows a bottom view of the cable management device of FIG. 25.
Figures 27, 28:
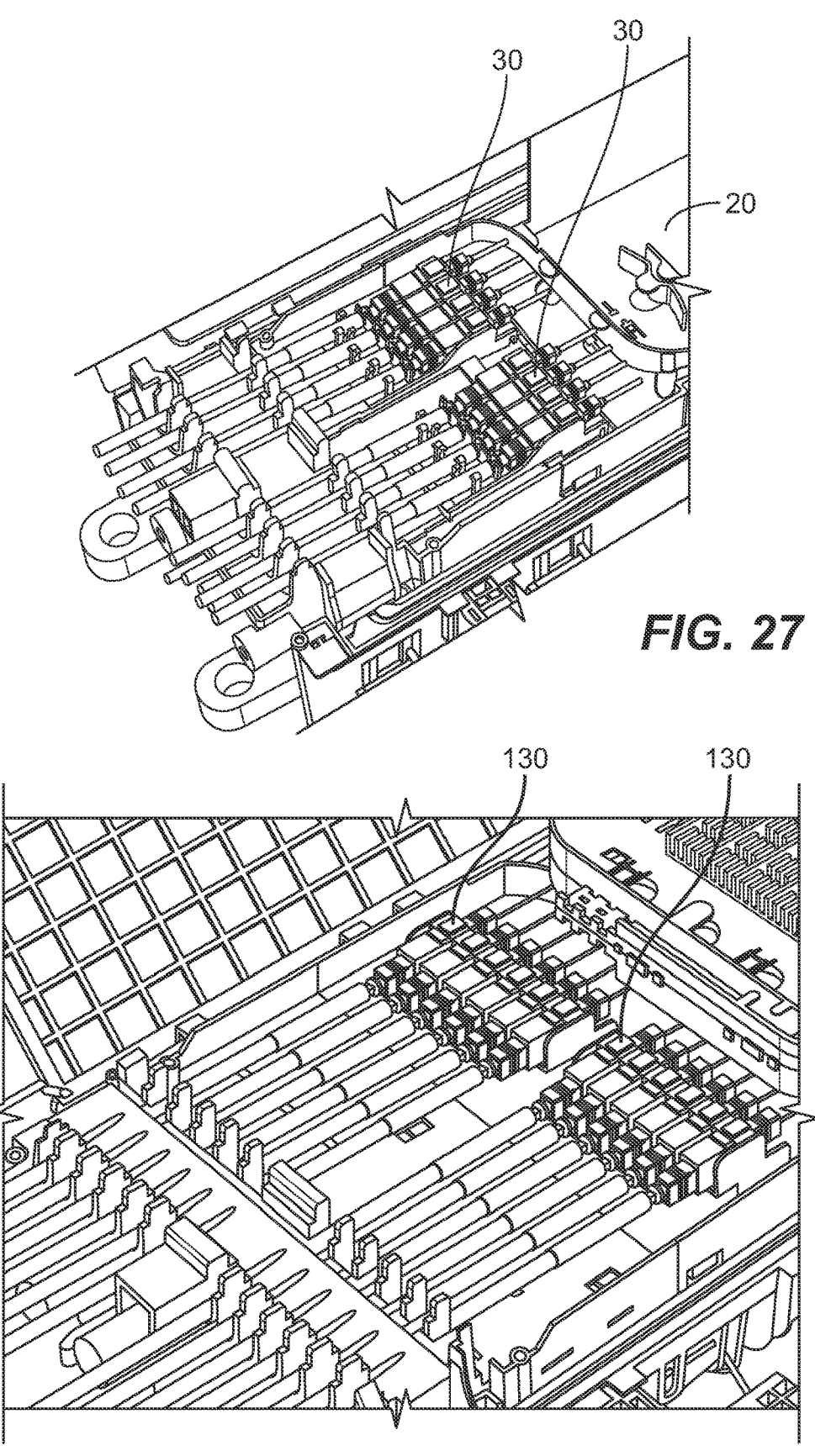
FIG. 27 shows a closure organizer with two of the four pack cable management devices including cables, connectors and adapters as shown in FIG. 6.
FIG. 28 shows a closure organizer with two of the six pack cable management devices including cables, connectors and adapters like that shown in FIG. 23.

FIGS. 25 and 26 show another embodiment of a cable management device 430, where the adapter holder 400 is a separate part from the cable holder 402, and mountable together with a snap 404. FIGS. 25 and 26 show an optional cable holder to be snapped on as needed for attaching to fiber optic cables.

The mounting interface 40 is provided for mounting a module, such as the noted cable management device 30, 130, 330, 430, to a further structure, such as organizer 20 where cables are managed, organized, spliced, split or connected to other cables through fiber optic adapters and connectors, simplex or multi fiber. The organizer 20 can be part of a telecommunications closure 10 or other telecommunications device or equipment.

In one embodiment, the cables 26, 28 to be managed are fiber optic cables.

The mounting interface 40 is provided between the cable management device and a mating device, such as the organizer, and includes one or a plurality of mating shapes which interlock with one another to form a mating interface. The shapes are designed for ease of mating, where some looseness in the fit is provided. See gaps 90, 92 of FIG. 11 parallel to base 22.

In one embodiment, the mating interface 40 includes interlocking shapes or structures 50 which provide engageable surfaces or shoulders 57, 59 which engage one another in at least one direction parallel to an axial direction of a cable or cables attached to the cable management device.

In one embodiment, the interlocking shapes 50 include one or a plurality of V-shapes and a reciprocal surface for receiving the one or the plurality of the V-shapes. The interlocking shapes can preferably include mating protrusions and recesses.

In one embodiment, two oppositely facing V-shapes are provided for mating along an axial direction of the cable in two opposite directions along the cable axis 100.

In one embodiment, the mounting interface 40 may also include one or a plurality of flexible tabs 42 which interlock with one or a plurality of mating shoulders 44. Such a feature provides retention of the cable management devices.

In one embodiment, the mounting interface may also include, or alternatively include, one or a plurality of clips 46 which interlock with one or a plurality of mating slots 48. Such a feature provides retention of the cable management devices. Such feature also may help take up any axial pull on cables 26.

In one embodiment, the cable management devices include a base portion 36 which holds a fiber optic adapter 60 for receiving mating connectors 62, 64. The fiber optic adapter receives two cables to be joined for signal transmission and the connectors which terminate the cables in axial alignment.

In one embodiment, one connector 64 terminates a cable 28 internal to the closure 10, and a second connector 62 mated to the first connector 64 terminates a cable 28 entering the closure.

In one embodiment, axial load applied to the second cable and the second connector is applied to the mounting interface, including the interlocking shapes, such as the protruding V-shapes, and the recessed V-shapes.

In one embodiment, the cable management devices are removably mounted to the organizer 20, or other device through the tabs 42 and clips 46.

What is claimed is:

1. A mounting interface comprising:
a cable management device and a mating device;
wherein the cable management device includes a base portion;
a plurality of fiber optic adapters mounted to an upper surface of the base portion for receiving mating connectors on the upper surface of the base portion along an axial direction;
a plurality of pairs of oppositely facing V-shaped protrusions on a lower surface of the base portion, each pair of V-shaped protrusions of the plurality of pairs of oppositely facing V-shaped protrusions in axial alignment and parallel to the axial direction;
a plurality of pairs of oppositely facing V-shaped recesses on an upper surface of the mating device for mating with the plurality of pairs of oppositely facing V-shaped protrusions, each pair of V-shaped recesses of the plurality of pairs of oppositely facing V-shaped recesses in axial alignment and parallel to the axial direction;
wherein each pair of V-shaped protrusions of the plurality of pairs of oppositely facing V-shaped protrusions engages with one of the pairs of V-shaped recesses of the plurality of pairs of oppositely facing V-shaped recesses, wherein relative movement of the cable management device and the mating device in the axial direction is prevented by the engagement of the pairs of V-shaped protrusions and corresponding pairs of V-shaped recesses;
a plurality of flexible tabs on the cable management device which interlock with a plurality of mating shoulders on the mating device; and
a plurality of clips on the cable management device which interlock with a plurality of mating slots on the mating device;
wherein engagement of the plurality of flexible tabs on the cable management device with the plurality of mating shoulders on the mating device, and engagement of the plurality of clips on the cable management device with the plurality of mating slots on the mating device prevents relative movement of the cable management device and the mating device in a direction transverse to the axial direction.

\* \* \* \* \*